United States Patent [19]
Takayama

[11] Patent Number: 5,089,890
[45] Date of Patent: Feb. 18, 1992

[54] GAMMA CORRECTION DEVICE

[75] Inventor: Tsutomu Takayama, Kanagawa, Japan

[73] Assignee: Canon Kabushiki Kaisha, Tokyo, Japan

[21] Appl. No.: 469,144

[22] Filed: Jan. 24, 1990

[30] Foreign Application Priority Data

Feb. 6, 1989 [JP] Japan .................................. 1-025819
Feb. 6, 1989 [JP] Japan .................................. 1-025820

[51] Int. Cl.$^5$ .......................................... H04N 5/202
[52] U.S. Cl. .................................... 358/164; 358/169
[58] Field of Search ................................ 358/164, 169

[56] References Cited

U.S. PATENT DOCUMENTS 3,277,318 10/1966 Bedford ............................. 358/164
4,450,482 5/1984 Ackermann ....................... 358/164
4,799,106 1/1989 Moore et al. ....................... 358/164
4,931,864 6/1990 Kawamura et al. ................ 358/164

FOREIGN PATENT DOCUMENTS

30319 3/1977 Japan ................................... 358/164

Primary Examiner—John W. Shepperd
Attorney, Agent, or Firm—Robin, Blecker, Daley & Driscoll

[57] ABSTRACT

A gamma correction device comprises a classifying circuit which divides an input video signal into a plurality of level ranges according to a plurality of signal levels; a computing circuit which computes the region of the video signal within each of the level ranges obtained by the classifying circuit; and a gamma correction control circuit which is arranged to have the gamma correction characteristic thereof controlled according to each region computed by the computing circuit, to gamma-correct the input video signal and to output the gamma-corrected video signal.

37 Claims, 12 Drawing Sheets

GAMMA CORRECTION DEVICE

BACKGROUND OF THE INVENTION

1. Field of the Invention

This invention relates to a gamma correction device for an image sensing device or the like.

2. Description of the Related Art

Figure 1:
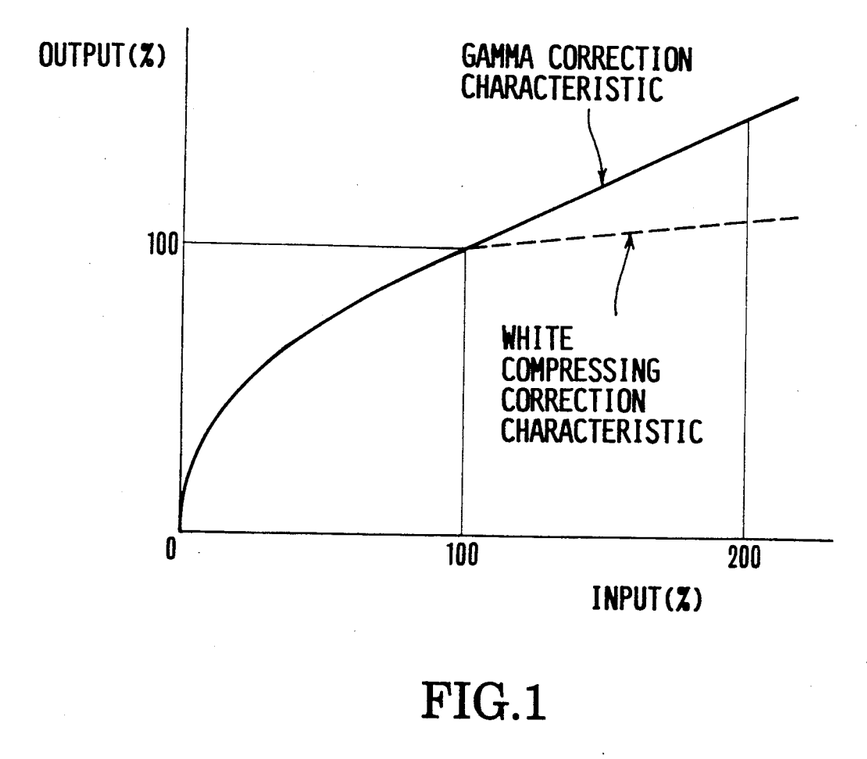
FIG. 1 is a graph showing the conventional gamma correction characteristic.

Heretofore, to correct the non-linearity of the light emission characteristic of the luminescent material of a TV Braun tube, gamma correction has been made beforehand by an image sensing device, for example, on the basis of a gamma correction characteristic such as $y=x^\gamma$ and $\gamma=0.4$ to 0.5 as shown in FIG. 1.

However, in the above-stated example of the conventional arrangement, the gamma correction characteristic is always fixed. Therefore, in the event of a very bright object, for example, the image of the object cannot be fully reproduced on the Braun tube and the arrangement tends to give a blank white part.

To solve this problem, there has been proposed a method of making white compressing correction as indicated with a broken line in FIG. 1. However, this method merely prevents bright image parts from becoming blank. According to this method, dark image parts or intermediate signal levels are apt to have an insufficient tone depending on the kind of the object. In cases where sunny and shady places commingle under sunlight within one and the same still picture, both black and white (dark and bright) parts become blank to give a picture which is not adequately appreciable by the human eye.

SUMMARY OF THE INVENTION

This invention is directed to the solution of the above-stated problems of the prior art. It is therefore an object of the invention to provide a gamma correction device which excels in tone reproducibility.

To attain this object, a gamma correction device according to this invention is arranged to control a gamma correction characteristic according to the level regions of a video signal. More specifically, the device is arranged as described in the following paragraphs (1) and (2):

(1) The device comprises the following elements a, b and c:
   a. Classifying means for classifying an input video signal with a plurality of signal levels into a plurality of level ranges.
   b. Computing means for computing a region of the video signal within each of the plurality of level ranges obtained by the classifying means.
   c. Gamma correction control means arranged to have a gamma correction characteristic controlled according to each region computed by the computing means, to gamma-correct the input video signal and to output the gamma-corrected video signal.

(2) In the arrangement (1) above, the gamma correction control means is arranged such that gains of signals of the plurality of level ranges obtained by the classifying means are controlled separately from each other.

In accordance with the arrangement described in Paragraphs (1) and (2) above, the gamma correction characteristic is controlled on the basis of the region of the input video signal for each of the level ranges.

To attain the above-stated object, a gamma correction device which is another embodiment of this invention controls a gamma correction characteristic according to either an average value or an integrated value of the levels of a video signal obtained within each of different level ranges. More specifically, the device is arranged as described in the following paragraphs (3) and (4):

(3) The device comprises the following elements:
   a. Classifying means for classifying an input video signal with a plurality of signal levels into a plurality of signal ranges.
   b. Detecting means for detecting an average or integrated value of the video signal for each of the plurality of level ranges obtained by the classifying means.
   c. Gamma correction control means arranged to have a gamma correction characteristic controlled according to the average or integrated value of the video signal detected by the detecting means for each of the plurality of level ranges, to gamma-correct the input video signal and to output the gamma-corrected video signal. signal.

(4) In the above-stated arrangement (3), the gamma correction control means is arranged such that gains of signals of the plurality of level ranges obtained by the classifying means are controlled separately from each other.

In accordance with the arrangement described in Paragraphs (3) and (4), the gamma correction characteristic is controlled on the basis of the average or integrated value of the input video signal for each of the signal level ranges.

The above and other objects and features of the invention will become apparent from the following detailed description of embodiments thereof taken in conjunction with the accompanying drawings.

DETAILED DESCRIPTION OF THE PREFERRED EMBODIMENTS

Figure 2:
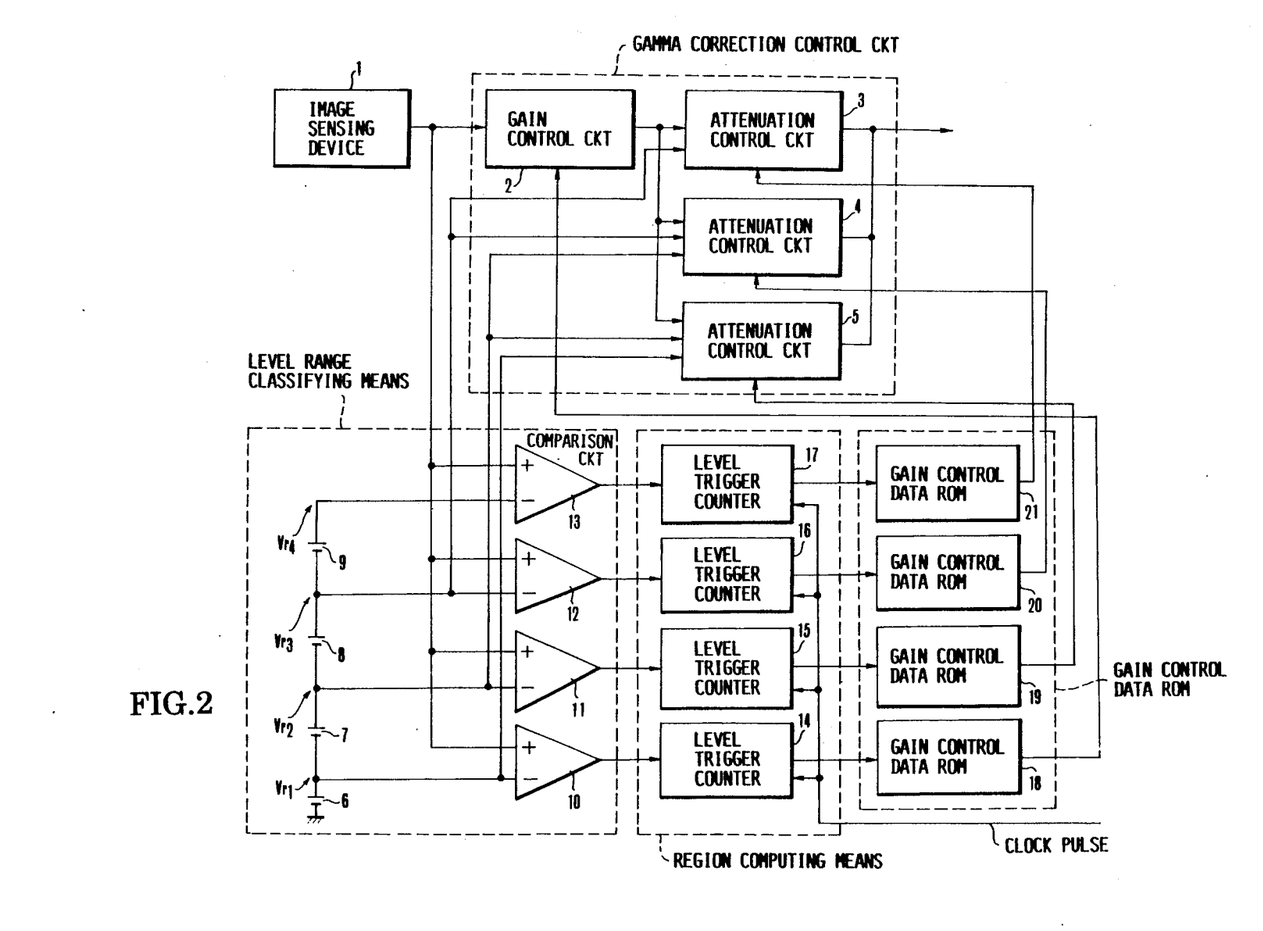
FIG. 2 is a block diagram showing the arrangement of a first embodiment of this invention.

Embodiments of the invention are described as follows:

FIG. 2 shows in a block diagram a gamma correction device arranged according to this invention as a first embodiment thereof. Referring to FIG. 2, the illustration includes an image sensing device 1. A gain control circuit 2 is arranged to vary the degree of gain according to voltage. Attenuation control circuits 3, 4 and 5 are arranged to vary, according to the voltage, the attenuation degree of signals of given level ranges. There are provided reference power sources 6 to 9. The power sources 6 to 9 produce voltages Vr1 to Vr4 as reference signal levels. The device further comprises comparison circuits 10 to 13; level trigger counters 14 to 17; and ROMs 18 to 21 for gain control data.

Figure 3:
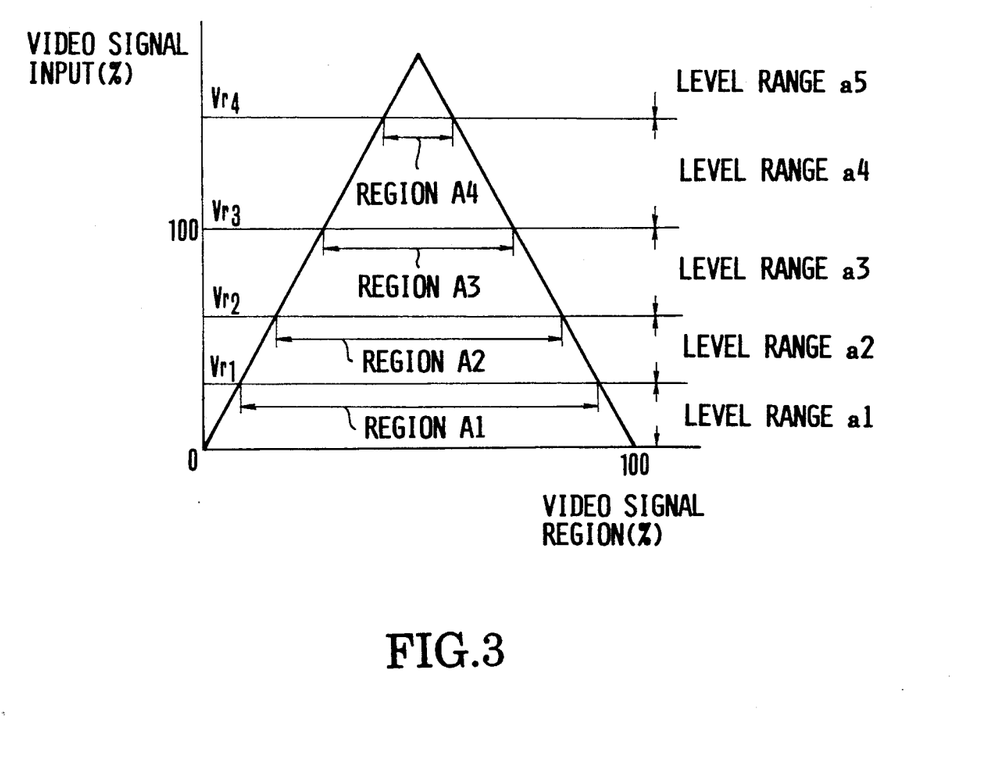
FIG. 3 is a conceptual representation of the video signal level-range classification and video signal regions of the first embodiment.

With the first embodiment arranged as described above, a video signal supplied from the image sensing device 1 is compared by the comparison circuits 10 to 13 with the voltages Vr1 to Vr4 output from the reference power sources 6 to 9 as a plurality of reference signal levels. The concept of this comparison is as shown in FIG. 3. Each of the comparison circuits 10 to 13 produces a level signal at a high (H) level when the level of the input video signal exceeds the voltage. Through this process, the input video signal is divided into different level ranges a1 to a5. The level trigger counters 14 to 17 respectively count the high level signals for the level ranges a1 to a4 in a level triggering manner. Then, regions (integrating time values) A1 to A4 of these level ranges a1 to a4 are computed by the count numbers thus obtained. The gain control data ROMs 18 to 21 produce voltages for gain control according to the regions A1 to A4.

Figure 4:
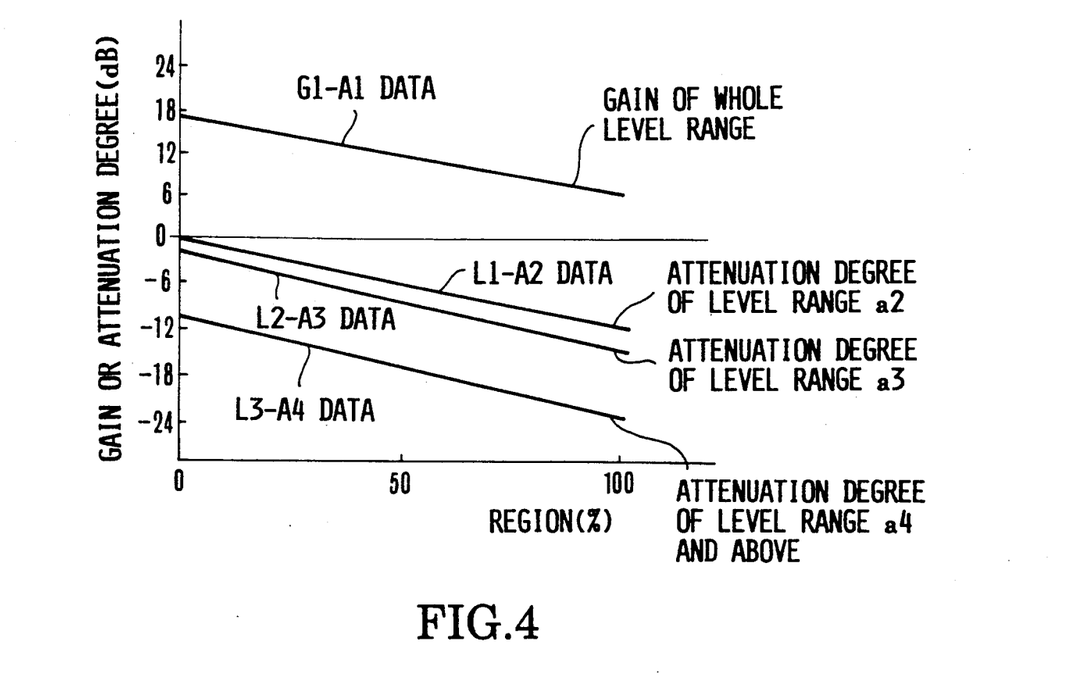
FIG. 4 shows the contents of a gain control data ROM of the first embodiment.

The gain control circuit 2 and the attenuation control circuits 3 to 5 jointly form a gamma correction control circuit. FIG. 4 shows by way of example the contents of the gain control data ROMs. The gain control circuit 2 which controls the video signal gain of the overall level range is controlled by the output of the data ROM 18 as represented by G1-A1 data in FIG. 4. The attenuation degree (negative gain) of the video signal within the level range a2 is controlled by the attenuation control circuit 5 according to the output of the data ROM 19, as indicated by L1-A2 data in FIG. 4. The attenuation degree of the video signal within the level range a3 is controlled by the attenuation control circuit 4 according to the output of the data ROM 20, as indicated by L2-A3 data in FIG. 4. Further, the attenuation degree of the video signal within the level range a4 and above is controlled by the attenuation control circuit 3 according to the output of the data ROM 21, as indicated by L3-A4 data in FIG. 4. Through this process, the gamma correction characteristic is eventually controlled including a white compression correcting action on the video signal.

Further, the embodiment is arranged to allow the video signal of the level range a1 to pass through the attenuation control circuit 5 without attenuation.

Figure 5:
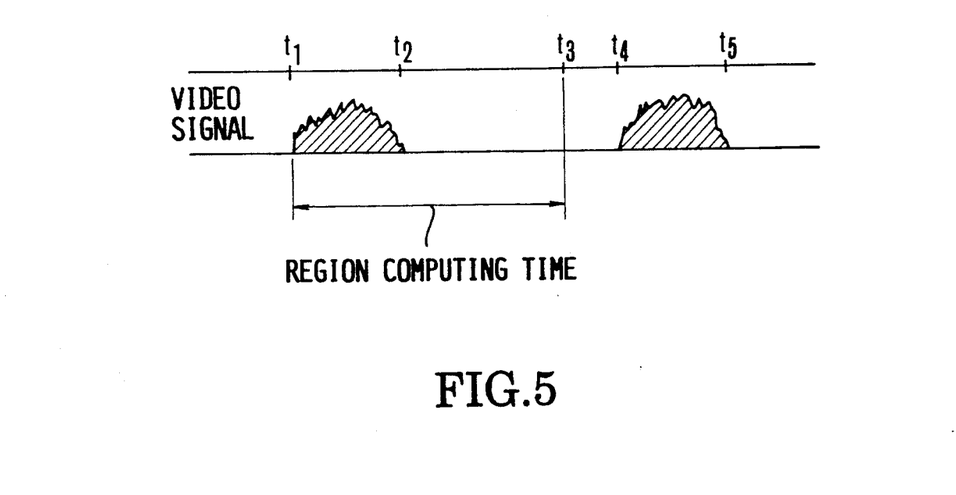
FIG. 5 shows a relation obtained between a video signal and a region computing time of the first embodiment.

The above-stated arrangement necessitates the embodiment to have a period of time for computing the region according to the level range of the video signal. Therefore, the gamma correction cannot be carried out in real time. In view of this, the arrangement of this embodiment can be advantageously applied to an electronic still video camera or the like that is arranged to be used for obtaining a still picture. In that instance, a video signal to be used for computing the region is read out beforehand from the image sensing device 1 during a period of time between time points t1 and t2 as shown in FIG. 5. After that, the region computing operation is performed during a period of time between time points t1 and t3. The gamma correction control is carried out over a video signal read out during a period between time points t4 and t5 according to the result of the region computing operation.

Figure 6:
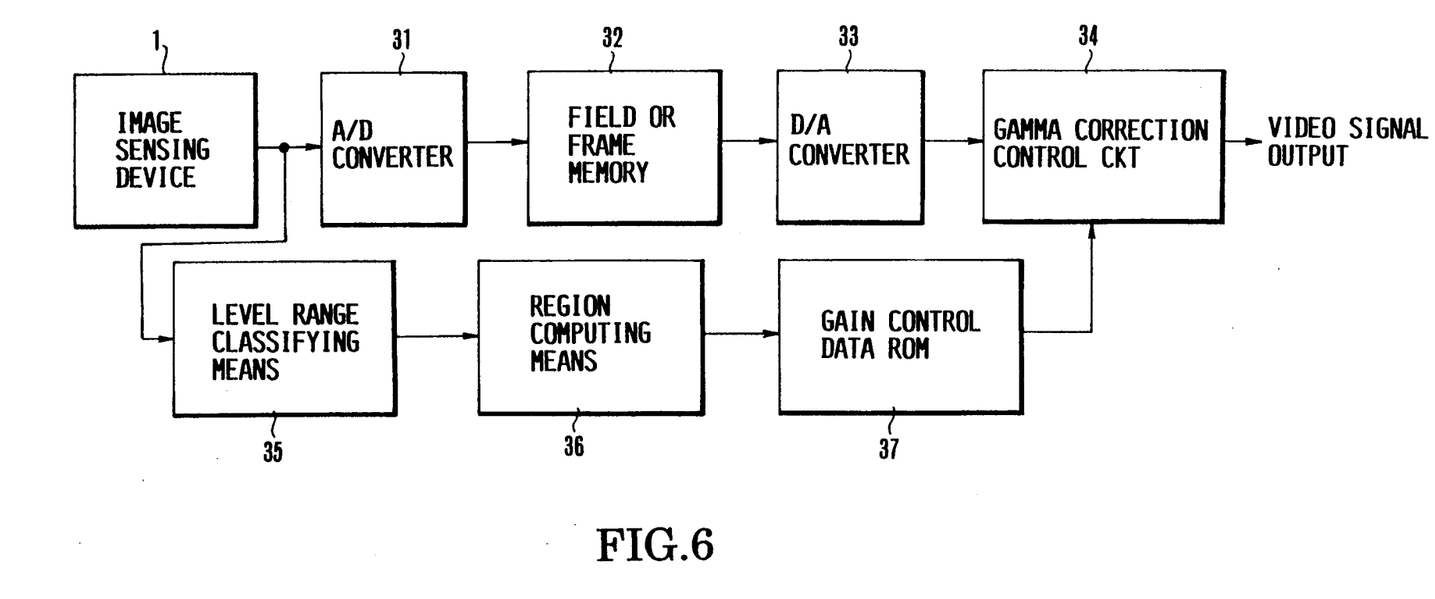
FIG. 6 is a block diagram showing the arrangement of a second embodiment of the invention.

FIG. 6 shows in a block diagram a second embodiment of the invention. The illustration includes an analog-to-digital (hereinafter referred to as A/D) converter 31; a field or frame memory 32; a digital-to-analog (hereinafter referred to as D/A) converter 33; and elements 34 to 37 which are arranged to perform the same functions as those of the corresponding elements shown in FIG. 2.

In the second embodiment, a video signal read out from the image sensing device 1 is adequately gamma-corrected through a level range classifying means 35, a region computing means 36, a gain control data ROM 37 and a gamma correction control circuit 34 in the same manner as in the case of the first embodiment. The second embodiment, however, differs from the first embodiment in that: The video signal is digitized by the A/D converter 31. The digital signal thus obtained is stored in the field or frame memory 32. Meanwhile, the region is computed and apposite gamma correction data is read out from the gain control data ROM 37. The digital signal is converted back to an analog signal by the D/A converter 33. After that, the gamma correction is adequately carried out by the gamma correction control circuit 34.

Figure 7:
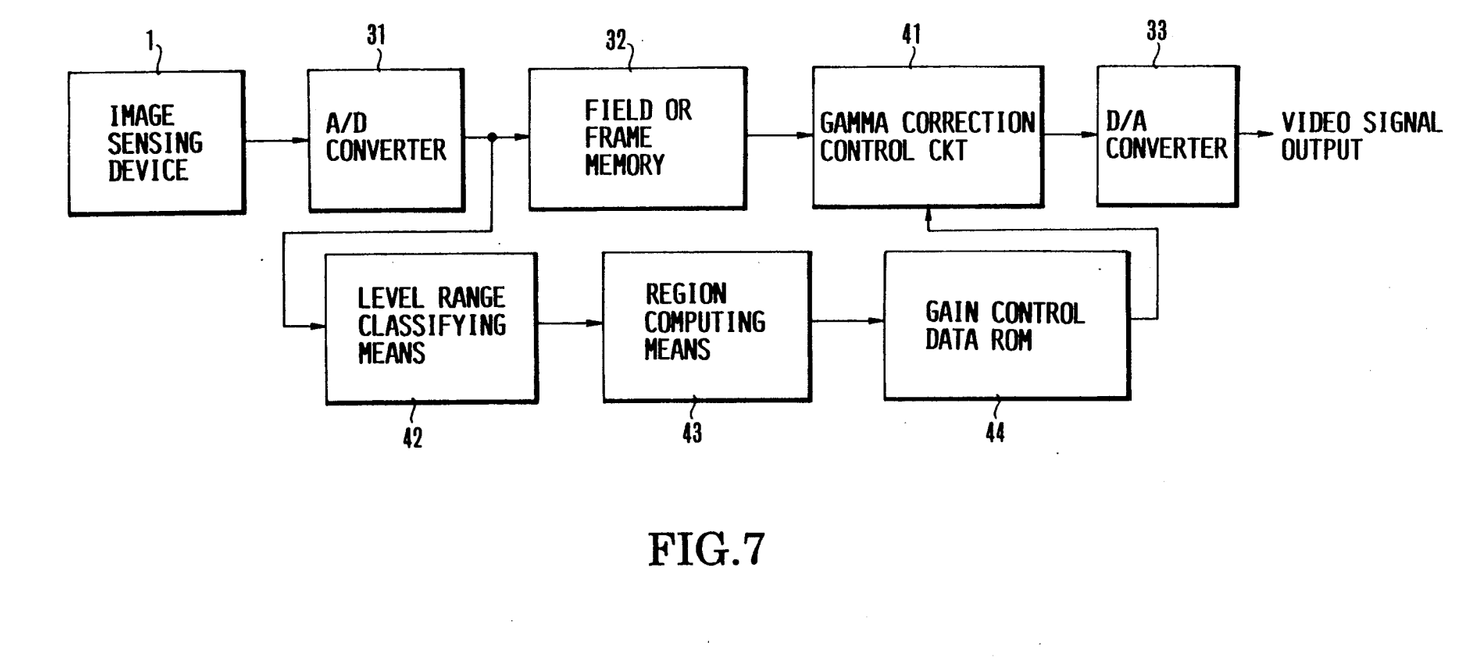
FIG. 7 is a block diagram showing the arrangement of a third embodiment of the invention.

FIG. 7 shows in a block diagram the arrangement of a third embodiment of the invention. In the case of the third embodiment, the video-signal-level-range classifying action is arranged to be performed on a digital signal obtained by digitizing the video signal by an A/D converter 31. A gamma correction control circuit 41, a level range classifying means 42, a region computing means 43 and a gain control data ROM 44 are arranged to perform their actions also on the digital signal in carrying out the gamma correction control. The process on the video signal in the form of a digital signal can be easily accomplished in accordance with the arrangement of a known digital signal processing circuit and, therefore, the details of the process are omitted from description.

In each of the embodiments described, the gamma correction control is accomplished by the combined use of circuits which are arranged to control the gain or attenuation of the video signal according to the regions computed. However, this invention is not limited to that arrangement. The arrangement may be changed and the gamma correction control may be differently carried out, for example, in the following manner: Gamma correction characteristics which are categorically patternized to correspond to the above-stated regions are arranged beforehand and stored in a memory. An applicable categorical pattern is determined according to the value of each region of the input video signal. Then, the gamma correction control can be accomplished by reading out the applicable categorical pattern.

As described in the foregoing, each of the embodiments described is arranged to divide or classify the video signal obtained from the image sensing device into a plurality of signal level ranges; to compute the value of the region of the signal within each of the divided level ranges; and to control the gamma correction characteristic according to the values of the regions thus obtained. This arrangement enables the embodiment to make apposite gamma correction according to the brightness contrast of the image of the object. The arrangement thus effectively reduces the possibility of having white or black blank parts to give an image tone which is close to the luminosity factor of the human eye.

Figure 8:
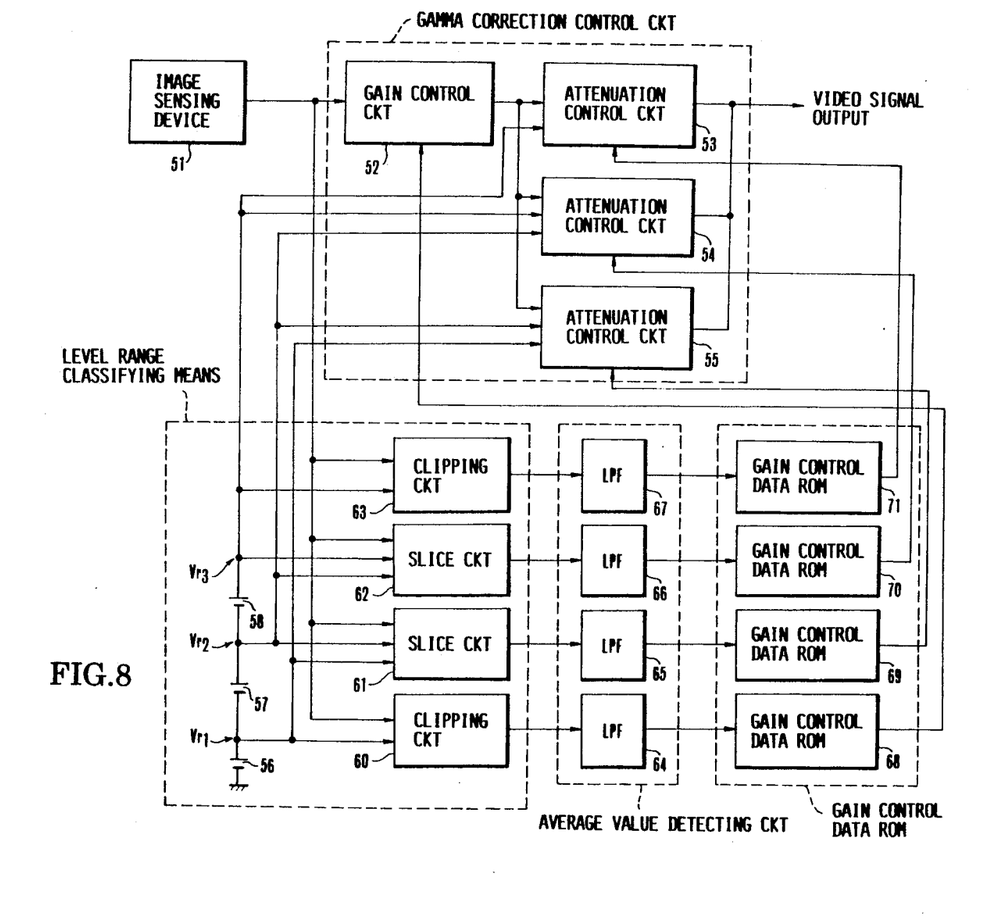
FIG. 8 is a block diagram showing a fourth embodiment of the invention.

FIG. 8 shows in a block diagram a gamma correction device which is arranged also according to this invention as a fourth embodiment thereof. The illustration includes an image sensing device 51; a gain control circuit 52 which is arranged to vary the degree of signal gain according to voltage; attenuation control circuits 53, 54 and 55 each of which is arranged to vary the degree of signal attenuation within a given level range; reference power sources 56, 57 and 58; and voltages Vr1, Vr2 and Vr3 which are produced from these power sources. A clipping circuit 60 is arranged to clip a video signal portion above the voltage Vr1. A slice circuit 61 is arranged to take out a video signal portion within a voltage range between the voltages Vr1 and Vr2. Another slice circuit 62 is arranged to take out a video signal portion within a voltage range between the voltages Vr2 and Vr3. Another clipping circuit 63 is arranged to clip a video signal portion below the voltage Vr3.

The fourth embodiment further comprises low-pass filters (LPFs) 64 to 67; and gain control data ROMs 68 to 71.

Figure 9:
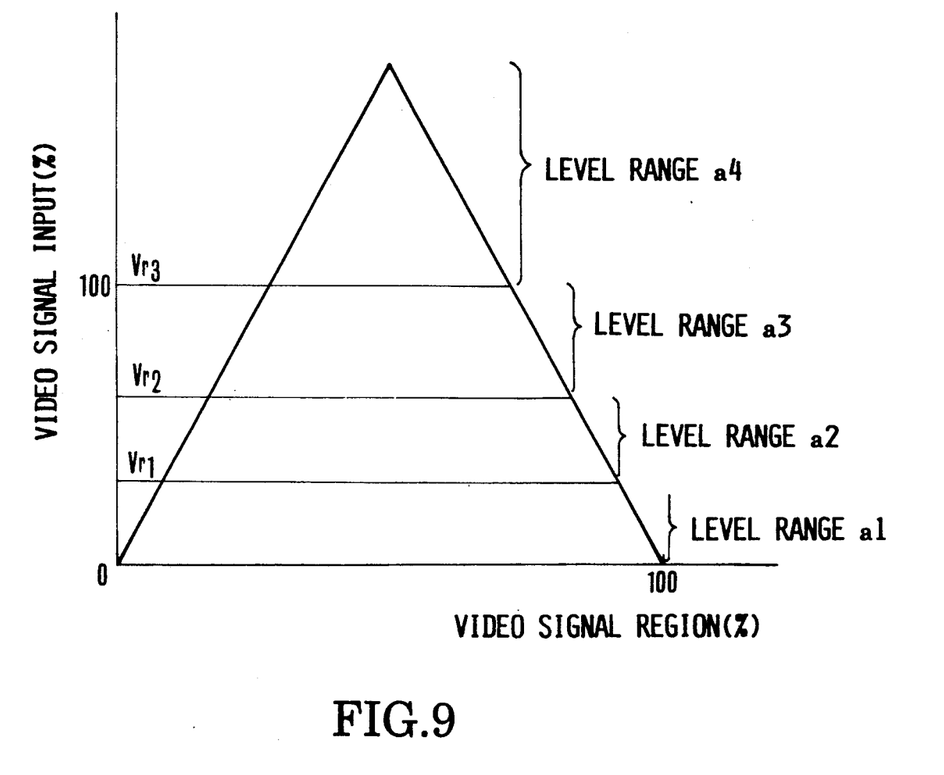
FIG. 9 is a conceptual representation of a relation obtained by the same embodiment between a video signal and its level ranges.
Figure 10:
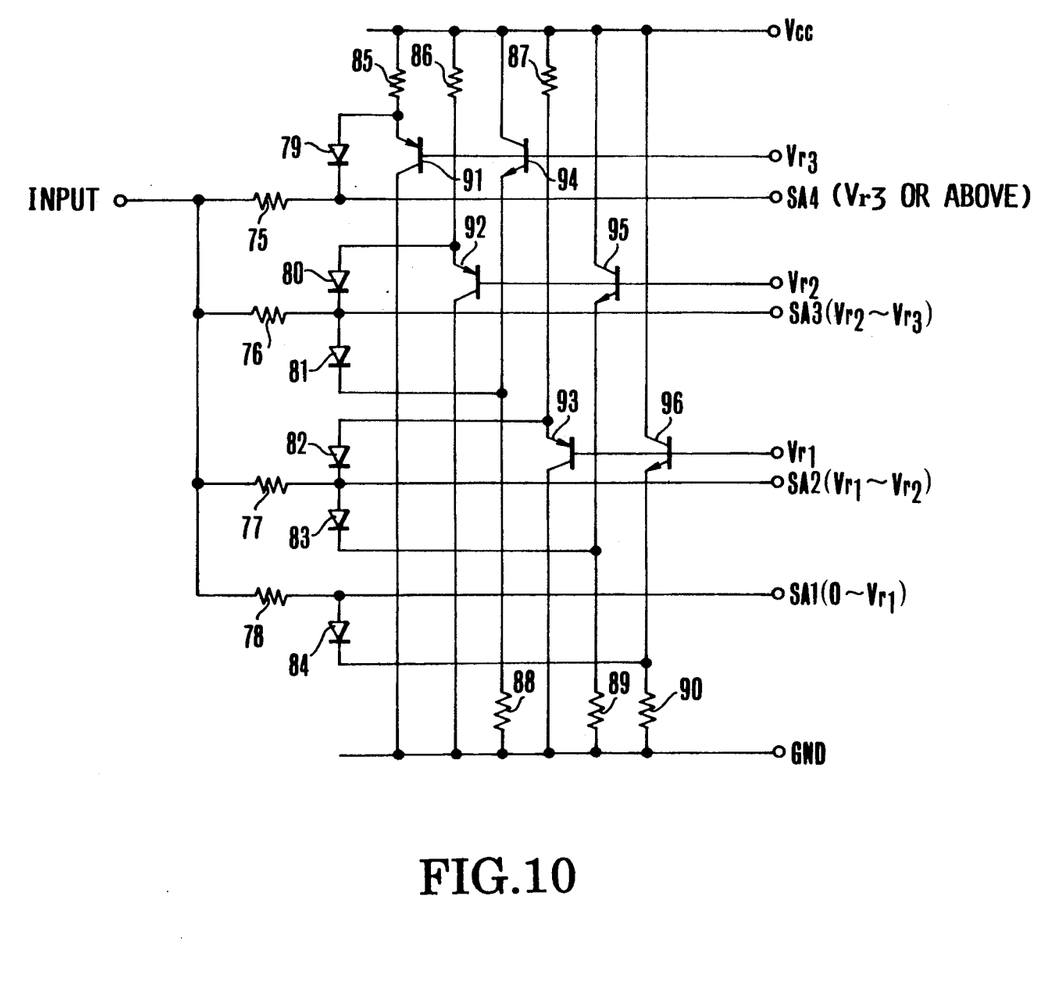
FIG. 10 is a circuit diagram showing the level range classifying circuit of the same embodiment.

In the arrangement described above, a video signal output from the image sensing device 51 is classified and divided by the clipping circuits 60 and 63 and the slice circuits 61 and 62 into different level ranges a1 to a4 according to the voltages Vr1, Vr2 and Vr3 output from the reference power sources 56, 57 and 58 as conceptually shown in FIG. 9. This clipping circuits 60 and 63 and the slice circuits 61 and 62 can be simply arranged as shown in FIG. 10. Referring to FIG. 10, the illustration includes resistors 75 to 78 and 86 to 90; diodes 79 to 84; PNP transistors 91, 92 and 93; and NPN transistors 94, 95 and 96. An input video signal which passes through the resistor 78 comes to the diode 84. A part of the video signal larger than the voltage Vr1 applied to the base of the transistor 96 is clipped off by the diode 84. Only a signal part within the level range a1 is allowed to be output from a terminal SA1. A signal passing through the resistor 77 has its part which is smaller than the voltage Vr1 applied to the base of the transistor 93 clipped off by the diode 82. Another signal part which is larger than the voltage Vr2 applied to the base of the transistor 95 is clipped off by the diode 83. As a result, a signal part which is between the voltage Vr1 and Vr2 is allowed to be output from a terminal SA2 in a sliced state. From a terminal SA3 is output a signal which is likewise obtained by slicing the input video signal part of a level between the voltages Vr2 and Vr3. Another signal obtained by slicing the input video signal part not exceeding the voltages Vr3 is output from a terminal SA4.

The video signal is thus divided into the level ranges a1 to a4. The signals thus obtained are averaged through LPFs 64 to 67 to obtain the average values of the signals within the level ranges respectively. Then, in accordance with these average values of signals within the level ranges a1 to a4, voltage signals which are to be used for gain control are read out from the gain control data ROMs 68 to 71 and are supplied to the above-stated circuits 52 to 55.

Figure 11:
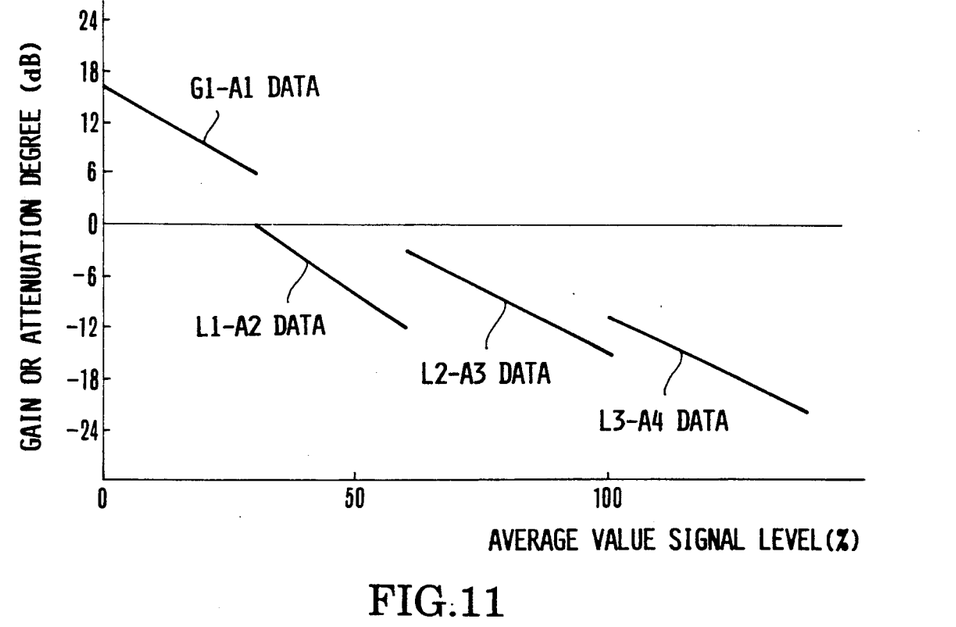
FIG. 11 shows the contents of the gain control data ROM of the same embodiment.

The gain control circuit 52 and the attenuation control circuits 53, 54 and 55 form a gamma correction control circuit. FIG. 11 shows by way of example the contents of the gain control data ROMs 68 to 71. The gain of the video signals of all the level ranges shown in FIG. 9 is controlled by the gain control circuit 52 with the output of the data ROM 68 as indicated by G1-A1 data in FIG. 11. The attenuation degree (negative gain) of the video signal within the level range a2 is controlled by the attenuation control circuit 55 with the output of the data ROM 69 a indicated by L1-A2 data in FIG. 11. The attenuation degree of the video signal within the level range a3 is controlled by the attenuation control circuit 54 with the output of the data ROM 70 as indicated by L2-A3 in FIG. 11. The gain of the video signal within the level range a4 is controlled by the attenuation control circuit 53 with the output of the data ROM 71 as indicated by L3-A4 data in FIG. 11. As a result, the gamma correction characteristic is controlled including the white compressing correction of the video signal.

Further, the signal within the level range al is arranged to pass without attenuation through the attenuation control circuit 55.

Figure 12:
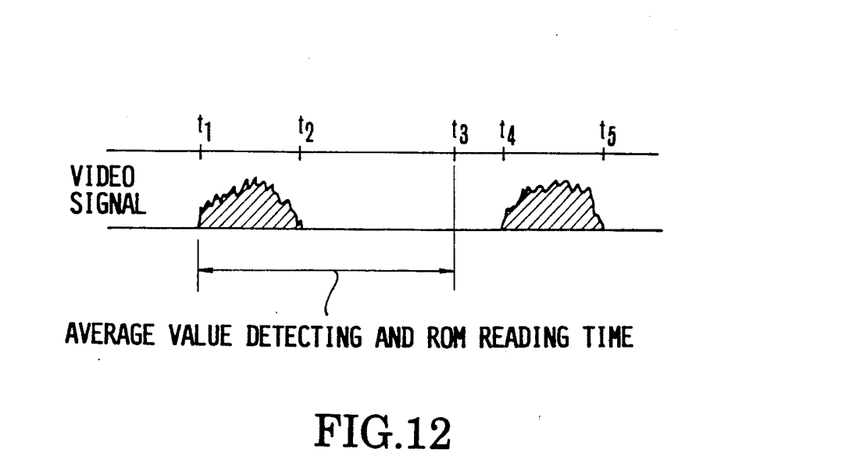
FIG. 12 shows a relation obtained by the same embodiment between a video signal and an average value detecting and ROM reading time.

This embodiment, as described in the foregoing, requires time for detecting the average values of the video signal obtained within the level ranges and for reading out the gain control data on the basis of the results of detection. Therefore, the gamma correction cannot be accomplished in real time. In view of this, the effect of this invention is advantageously attainable with the arrangement of this embodiment applied to an electronic still camera or the like. In that instance, for detecting the average value, a one-field or -frame amount of the video signal is read out beforehand from the image sensing device 1 during a period between time points t1 and t2 as shown in FIG. 12. The average value of this amount of signal is detected during a period between time points t1 and t3. Then, a degree of gamma correction control obtained as a result of this is applied to the video signal read out during a period between time points t4 and t5 as shown in FIG. 12.

The same operation can be accomplished with the LPFs 64 to 67 replaced with integrating circuits.

Figure 13:
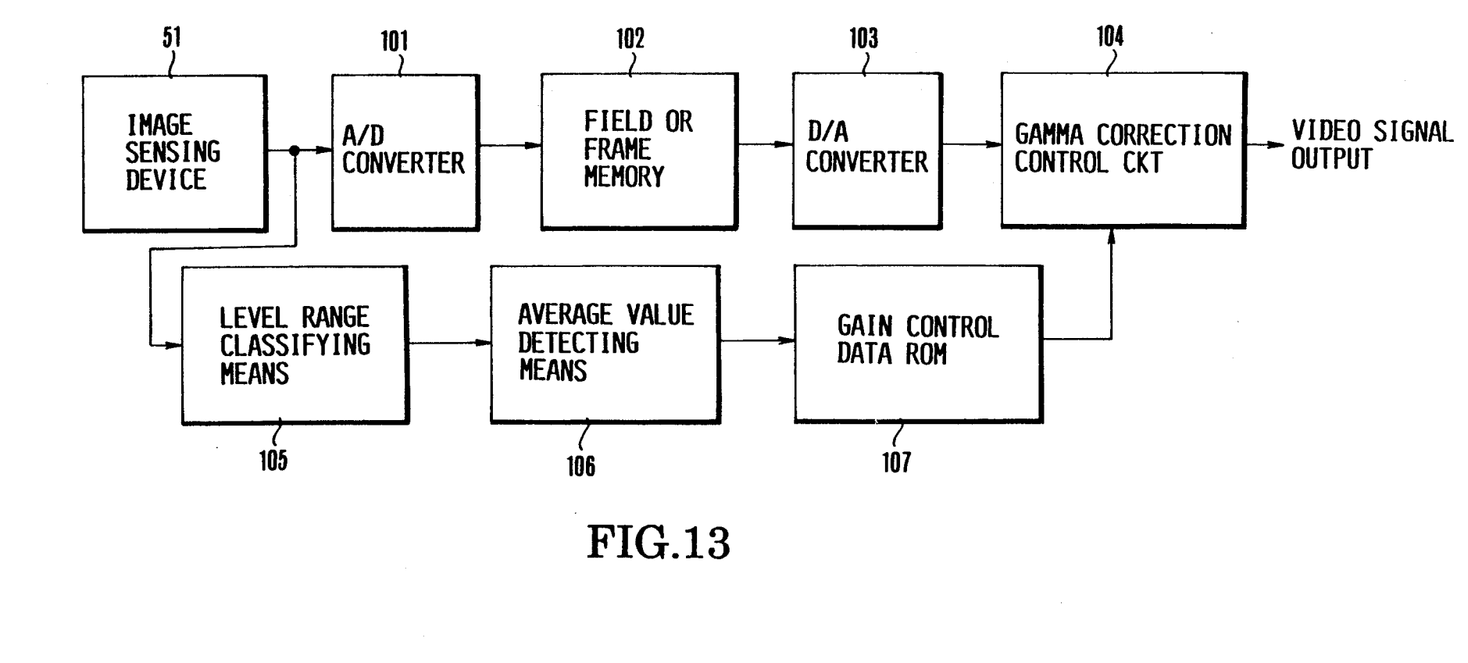
FIG. 13 is a block diagram showing a fifth embodiment of the invention.

FIG. 13 shows in a block diagram a fifth embodiment of the invention. The illustration includes an A/D converter 101; a field or frame memory 102; a D/A converter 103; and other elements 104 to 107 which are arranged to function in the same manner as the blocks indicated by broken lines in FIG. 8.

The fifth embodiment is arranged to make gamma correction on a video signal read out from an image sensing device 51 through a level range classifying means 105, an average value detecting means 106, a gain control data ROM 107 and a gamma correction control circuit 104 in the same manner as in the fourth embodiment. However, in the case of the fifth embodiment, the video signal is digitized, at the same time, by the A/D converter 101 and the digitized signal is stored in the field or frame memory 102. Meanwhile, the average value of the signal is detected by the average value detecting means 106; and apposite gamma correction data is read out from a gain control data ROM 107. After that, the digital signal is converted back into an analog signal by the D/A converter 103 and then the gamma correction is appositely carried out through the gamma correction control circuit 104.

Figure 14:
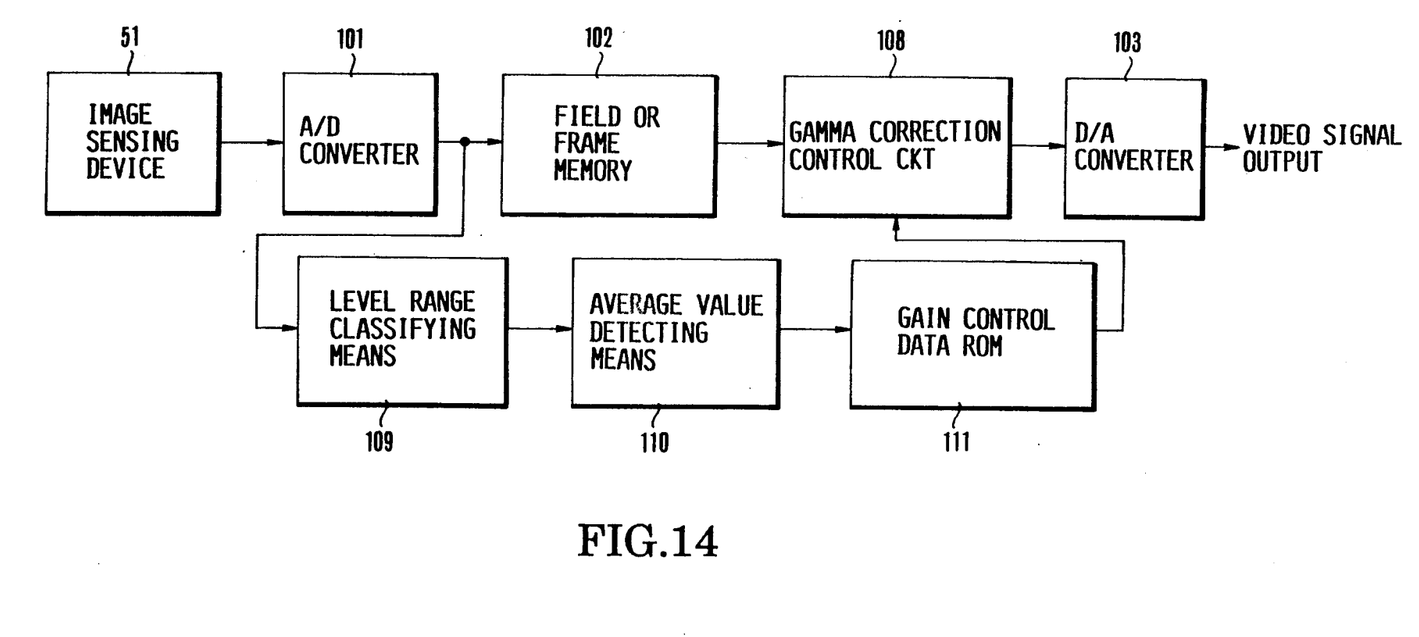
FIG. 14 is a block diagram showing a sixth embodiment.

FIG. 14 shows in a block diagram a sixth embodiment of the invention. This embodiment is arranged to perform the level range classifying action on a signal which has been digitized through an A/D converter 101. A gamma correction control circuit 108, a level range classifying means 109, an average value detecting means 110 and a gain control data ROM 111 are arranged to perform their actions on the digital signal before conversion back to an analog signal. The digital signal processing operation can be easily accomplished in accordance with the arrangement of a known digital signal processing circuit. Therefore, the details of it are omitted from description.

In each of the embodiments described, the gamma correction control is performed by a combination of circuits which are arranged to control the signal gain or attenuation in accordance with the average value obtained for each of the level ranges. However, the invention is not limited to this arrangement. For example, the arrangement may be changed as follows: Gamma correction characteristic data corresponding to the categorical patterns of the average values of the level ranges are stored in a memory; the categorical pattern of the average value of the input video signal is determined for each level range; and the gamma correction is controlled by reading out from the memory the gamma correction characteristic data which corresponds to the pattern. This method is advantageous in a case where gamma correction control is to be performed on a digital signal.

In accordance with the invented arrangement which has been described in the foregoing, the levels of the video signal obtained from the image sensing device are classified into a plurality of level ranges according to predetermined signal level values; the average or integrated value of the video signal obtained from within each of the level ranges is detected; and the gamma correction characteristic is controlled on the basis of the results of detection. This arrangement enables each of embodiments to make gamma correction appositely to the brightness contrast of the image sensing object. Therefore, the invented arrangement gives an image with an adequate tone close to the luminosity factor of the human eye.

What is claimed is:

1. A gamma correction device comprising:
 a. classifying means for classifying an input video signal into a plurality of level ranges according to a plurality of signal levels;
 b. computing means for computing a region of said input video signal within each of said plurality of level ranges obtained by said classifying means; and
 c. gamma correction control means arranged to have a gamma correction characteristic controlled according to each region computed by said computing means, to gamma-correct said input video signal and to output the gamma-corrected video signal.

2. A device according to claim 1, wherein said gamma correction control means is arranged to control separately from each other gains of signals of said plurality of level ranges obtained by said classifying means.

3. A device according to claim 1, wherein said classifying means includes a plurality of comparison circuits which are arranged to compare the level of said input video signal with a plurality of reference signal levels.

4. A device according to claim 1, wherein said computing means includes a plurality of level trigger counters.

5. A gamma correction device comprising:
 a. classifying means for classifying an input video signal into a plurality of level ranges according to a plurality of signal levels;
 b. computing means for computing a region of said input video signal within each of said plurality of level ranges obtained by said classifying means;
 c. control data holding means arranged to output a gain correction characteristic corresponding to each region computed by said computing means for every one of said plurality of level ranges; and
 d. gamma correction control means arranged to gamma-correct said input video signal according to control data output from said control data holding means and to output the gamma-corrected video signal.

6. A device according to claim 5, wherein said control data holding means includes a plurality of memory means for holding correction data for said plurality of level ranges respectively.

7. A device according to claim 5, wherein said gamma correction control means is arranged to control separately from each other gains of signals of said plurality of level ranges obtained by said classifying means.

8. A device according to claim 5, wherein said classifying means includes a plurality of comparison circuits which are arranged to compare the level of said input video signal with a plurality of reference signal levels.

9. A device according to claim 5, wherein said computing means includes a plurality of level trigger counters.

10. A device according to claim 3 or 8, wherein said classifying means includes reference signal generating means which has a plurality of power sources arranged in series with each other.

11. A device according to claim 1 or 5, wherein said gamma correction control means includes a gain control circuit arranged to perform gain control in a predetermined manner over said input video signal and a plurality of attenuation control circuits arranged to perform attenuation control in a predetermined manner respectively over an output of said gain control circuit.

12. A gamma correction device comprising:
 a. classifying means for classifying an input video signal into a plurality of level ranges according to a plurality of signal levels;
 b. detecting means for detecting an average value or integrated value of said video signal within each of said plurality of level ranges obtained by said classifying means; and
 c. gamma correction control means arranged to have a gamma correction characteristic controlled according to the average or integrated value of said input video signal detected by said detecting means for each of said plurality of level ranges, to gamma-correct said input video signal and to output the gamma-corrected video signal.

13. A device according to claim 12, wherein said gamma correction control means is arranged to control separately from each other gains of signals of said plurality of level ranges obtained by said classifying means.

14. A device according to claim 12, wherein said classifying means includes clipping and slice circuits arranged to clip and slice said input video signal with ranges according to a plurality of reference signal levels.

15. A device according to claim 14, said classifying means includes reference signal generating means which has a plurality of power sources arranged in series with each other.

16. A device according to claim 12, wherein said detecting means includes a plurality of filter means.

17. A device according to claim 12, wherein said detecting means includes a plurality of integrating circuits.

18. A device according to claim 12, wherein said gamma correction control means includes a gain control circuit arranged to perform gain control in a predetermined manner over said input video signal and a plurality of attenuation control circuits arranged to perform attenuation control in a predetermined manner respectively over an output of said gain control circuit.

19. A gamma correction device comprising:
a. classifying means for classifying an input video signal into a plurality of level ranges according to a plurality of signal levels;
b. detecting means for detecting an average value or integrated value of said video signal within each of said plurality of level ranges obtained by said classifying means;
c. control data holding means arranged to output a gain correcting characteristic according to the average or integrated value detected by said detecting means; and
d. gamma correction control means arranged to gamma-correct said input video signal according to control data output from said control data holding means and to output the gamma-corrected video signal.

20. A device according to claim 19, wherein said classifying means includes clipping and slice circuits arranged to clip and slice said input video signal with ranges according to a plurality of reference signal levels.

21. A device according to claim 19, said classifying means includes reference signal generating means which has a plurality of power sources arranged in series with each other.

22. A device according to claim 19, wherein said detecting means includes a plurality of filter means.

23. A device according to claim 19, wherein said detecting means includes a plurality of integrating circuits.

24. A device according to claim 19, wherein said gamma correction control means includes a gain control circuit arranged to perform gain control in a predetermined manner over said input video signal and a plurality of attenuation control circuits arranged to perform attenuation control in a predetermined manner respectively over an output of said gain control circuit.

25. A device according to claim 19, wherein said control data holding means includes a plurality of memory means for holding correction data for said plurality of level ranges respectively.

26. A device according to claim 1, 5, 12 or 19, wherein said input video signal is a digital signal.

27. A device according to claim 1, 5, 12 or 19, wherein said video signal supplied to said classifying means is a digital signal.

28. A gamma correction device for gamma-correcting an input video signal by controlling the level of said input video signal on the basis of a predetermined characteristic, characterized in that:
said characteristic is varied for every one of plural signal regions which are classified according to said level of the input video signal; and
the level of said video signal is controlled on the basis of said varied characteristics to output the level-controlled video signal.

29. A device according to claim 28, wherein said video signal is supplied from an image sensor.

30. A device according to claim 28, wherein level control is performed over a digitized video signal.

31. A signal level conversion device for converting levels of input signals on the basis of a predetermined conversion characteristic, comprising:
(a) classifying means for classifying input signals to a plurality of regions according to levels of the input signals; and
(b) conversion means for converting said input signals by different conversion characteristics for each of said plurality of regions.

32. A device according to claim 31, wherein said conversion charcteristic includes a gamma conversion characteristic.

33. A device according to claim 31, wherein said conversion characteristic includes a white compressing correction characteristic.

34. A device according to claim 31, wherein said input signal includes a signal output from image pick-up means.

35. A device according to claim 31, wherein said classifying means includes a slice circuit.

36. A device according to claim 31, wherein said classifying means includes a clipping circuit.

37. A device according to claim 31, wherein said conversion means includes a plurality of conversion tables each having a different conversion characteristic.

* * * * *